(No Model.)
F. WILKIE.
FISHING REEL.
No. 537,878. Patented Apr. 23, 1895.
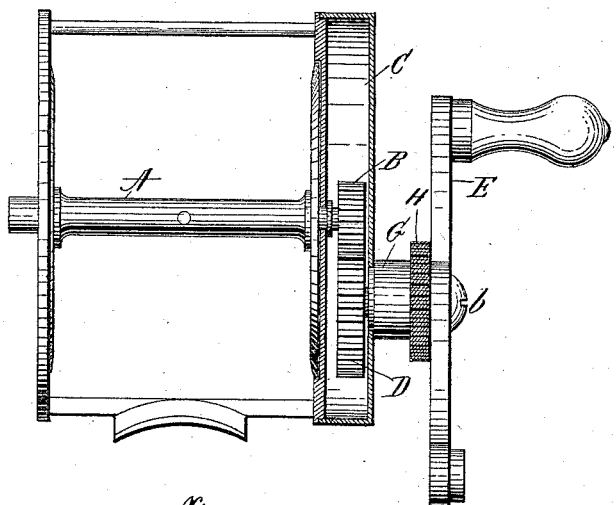
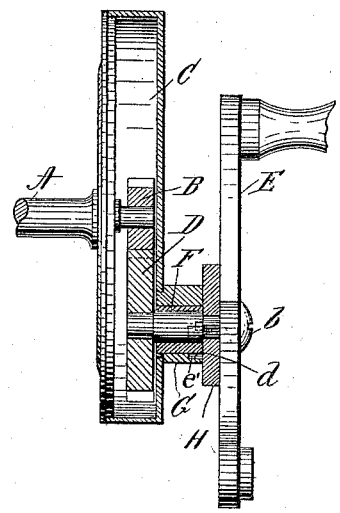
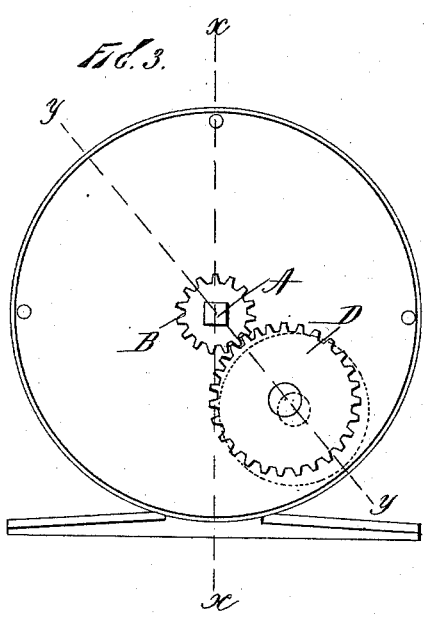
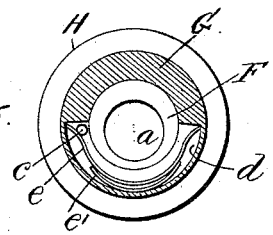
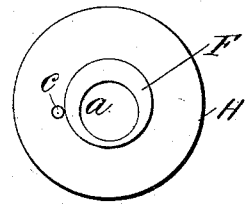
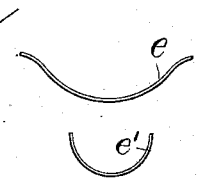
Witnesses:
John Buckler,
L. H. Osgood.
Inventor.
Fredrick Wilkie
By Worth Osgood,
Attorney.

United States Patent Office.

FREDRICK WILKIE, OF NEW YORK, N. Y.

FISHING-REEL.

SPECIFICATION forming part of Letters Patent No. 537,878, dated April 23, 1895.

Application filed December 8, 1894. Serial No. 531,184. (No model.)

*To all whom it may concern:*

Be it known that I, FREDRICK WILKIE, a citizen of the United States, and a resident of New York, in the county and State of New York, have invented certain new and useful Improvements in Fishing-Reels, of which the following is a specification.

My invention relates to that class of devices commonly called "fishing reels," and intended for use upon fishing poles—and especially does the invention relate to that variety of such reels wherein gears are employed between the handle or crank and the reel to multiply the motions of the latter with respect to those of the former; and the object of my invention is to provide simple, convenient, durable and efficient means for positively throwing the gears entirely in or out of engagement with each other and to maintain them in the relative positions to which they may be adjusted without danger of accidental disarrangement. The purpose of throwing the gears into engagement is that the line upon the reel may be rapidly wound as may be required—and of throwing them out of engagement, that the reel may be free to turn (as when the line is running out) without the crank being turned, which would impede the free movement of the line.

To accomplish the object above indicated, my improvements involve certain new and useful arrangements or combinations of parts and peculiar features of invention as will be herein first fully described and then pointed out in the claims.

In the drawings Figure 1 is a partial section and elevation upon a plane passing through line $x-x$ of Fig. 3, and Fig. 2 is a similar view upon a plane through line $y-y$ of same figure. Fig. 3 is an end view of the reel with the cap or cover detached, showing the location and possible arrangement of the gears. Fig. 4 is an end elevation of the movable eccentric and its stationary casing, looking toward the head on the eccentric. Fig. 5 is a cross section of the casing showing a recess in one portion thereof for accommodating a spring; and Fig. 6 is a plan showing one form of spring which may be employed (the parts of the spring being separated).

In all the figures like letters of reference, wherever they occur, indicate corresponding parts.

A is the shaft of the reel on which the line is carried, and B, the gear or pinion applied upon the end of this shaft.

C, is the cap or cover for the gears, and D, a second gear journaled in the cover and intended to be turned by a crank as E. The shaft of gear D is mounted in a short block or cylinder F which is eccentrically perforated as at $a$ to accommodate the shaft, and this block turns in a casing or collar G erected upon the exterior of the cap.

The cylinder F is provided with a knurled head H, that it may be easily turned by the thumb and finger, and it is held from displacement by the crank which abuts against a shoulder upon the shaft of the gear and secured to the shaft by a suitable pin or screw as at $b$. When the block F is turned so that the perforation through it is nearest the line of the axis of the reel, then gear D will engage fully with gear B,—and when turned to the diametrically opposite position (a half revolution in its casing) it will carry gear D entirely out of engaging position, the eccentricity being sufficiently great to accomplish this.

To arrest the movement of block F at the proper point in either direction an immovable or permanent stop should be supplied, and in the example shown this is provided by use of a pin $c$ which abuts at the limits of a recess $d$ formed in the outer end of casing G. The casing being stationary, when block F is turned in it as far as possible in either direction, the gears will be perfectly in mesh or entirely separated—and this is to obviate undue wear and imperfect engagement of the gears as is common in constructions which would admit of the gears being less positively and less perfectly moved and stopped.

To insure the complete movement of the gears in either direction and to hold them temporarily, I provide what I term a temporary stop. This may be made in various ways, the example shown being the most simple and compact which I have been able to devise. Within the recess $d$ is located a spring piece $e$ of which the ends are slightly bent outward as indicated to allow the pin $c$ to pass them, and having once passed one bent end, the pin is held by spring pressure against the adjacent end of the recess, and thus the block and gear are held in the desired positions. This temporary stop can be overcome by forcibly turning the block with the thumb and finger. When the pin has nearly approached the end of the recess the spring bears upon it in such way as to automatically compel it to complete the movement. The operator naturally turns the block until the click of the pin is heard against its final abutment. I prefer to provide a secondary spring as $e'$, shorter than $e$ and on the outside of it, and on this to depend for the greater part of the spring power required, the piece $e$ taking all the wear.

The parts are preferably adjusted so that by turning the block forward the gears will mesh together and the reel may be turned by use of the crank. Reverse movement of the block will release the reel and allow the line to run out without turning the crank.

The arrangement is compact and convenient, adds but little to the weight or cost of the reel, and will be found to answer all the purposes or objects of the invention previously set forth.

Having now fully described my invention, what I claim as new herein, and desire to secure by Letters Patent, is—

1. In a fishing reel, the multiplying gear, the eccentric block perforated to receive the shaft of said gear and provided with a head for turning it, and a casing for said block mounted upon the exterior of the cap or cover, the block being arranged to be turned from the exterior of the cap and independently of the gear shaft to carry the said gear into or out of engagement with the gear on the reel shaft, substantially as shown and described.

2. In a fishing reel, a multiplying gear having its shaft journaled in an eccentric block mounted in a casing upon the exterior of the cap or cover, said block being provided with a head for turning it independently of the gear shaft, and with a stop pin, and said casing being provided with an abutment for the pin, the parts being arranged and combined substantially as shown and described.

3. In a fishing reel, the multiplying gear, the eccentric block and a casing for said block, the casing being recessed to accommodate a spring affording a temporary stop, and the eccentric block carrying the shaft of the gear wheel being supplied with a stop pin, the parts being arranged and combined substantially as shown and described.

Signed at New York, in the county and State of New York, this 5th day of December, A. D. 1894.

FREDRICK WILKIE.

Witnesses:
W. J. MORGAN,
WORTH OSGOOD.